United States Patent
Zerial

(10) Patent No.: US 10,195,832 B2
(45) Date of Patent: Feb. 5, 2019

(54) EXTENSIBLE PAPER LAMINATES AND THEIR USES

(71) Applicant: Wolverine Automotive Board Sales, Inc., Monroe, MI (US)

(72) Inventor: Matthew Edward Zerial, Grand Rapids, MI (US)

(73) Assignee: WOLVERINE AUTOMOTIVE BOARD SALES, INC., Monroe, MI (US)

( * ) Notice: Subject to any disclaimer, the term of this patent is extended or adjusted under 35 U.S.C. 154(b) by 0 days.

(21) Appl. No.: 15/496,627

(22) Filed: Apr. 25, 2017

(65) Prior Publication Data

US 2017/0225441 A1 Aug. 10, 2017

Related U.S. Application Data

(63) Continuation-in-part of application No. 15/137,703, filed on Apr. 25, 2016.

(60) Provisional application No. 62/179,166, filed on Apr. 29, 2015.

(51) Int. Cl.
 B32B 29/00 (2006.01)
(52) U.S. Cl.
 CPC ........ *B32B 29/005* (2013.01); *B32B 2307/54* (2013.01); *B32B 2307/718* (2013.01); *B32B 2309/105* (2013.01); *B32B 2553/00* (2013.01)
(58) Field of Classification Search
 CPC .............. B32B 29/005; B32B 2307/54; B32B 2307/718; B32B 2309/105; B32B 2553/00
 USPC ....................................................... 428/535
 See application file for complete search history.

(56) References Cited

U.S. PATENT DOCUMENTS

| | | | | |
|---|---|---|---|---|
| 4,826,714 A | * | 5/1989 | King | D21H 23/68 229/5.85 |
| 6,454,500 B1 | * | 9/2002 | Shetty | B60P 7/065 410/119 |
| 2008/0284071 A1 | * | 11/2008 | Knewtson | B65B 13/02 267/91 |

OTHER PUBLICATIONS

Tolko Industries Ltd., Kraft Unbleached SPX®—Vector Product Specifications, Kraft Papers Division, 1 page, Specifications in effect as of Jan. 1, 2015.
Tolko Industries Ltd., Kraft Unbleached Spx®—Velocity Primer Product Specifications, Kraft Papers Division, 1 page, Specifications in effect as of Jan. 1, 2015.
Tolko Industries Ltd., Kraft Paper Product Specifications, Kraft Papers Division, 16 pages, Specifications in effect as of Jan. 1, 2016, [accessed from Internet Apr. 25, 2016, http://tolko.com/resources/standardsspecifications].

* cited by examiner

*Primary Examiner* — Leszek B Kiliman
(74) *Attorney, Agent, or Firm* — McGarry Bair PC

(57) ABSTRACT

An extensible kraft paper laminate is disclosed that includes at least one layer of an extensible kraft paper and at least one layer of a non-extensible kraft paper and/or one or more additional layers of the extensible kraft paper. The extensible kraft paper can have a basis weight of 25-200 pounds per 3000 sq. ft. and the layers can be laminated. The extensible kraft paper laminate can have a thickness of 0.500 inches or less and can exhibit a mullen of at least 125 psi. Some non-limiting uses for these extensible kraft paper laminates can include a sleeve, a reel wrap, a slip sheet, a carrying crate, a fiber drum, a food carton, a medical carton, a box for trash, a furniture back panel, a sheathing board, a military packaging box, and/or a variety of other packaging or storage devices.

31 Claims, 17 Drawing Sheets

POSSIBLE COMBINATIONS FOR END PANEL LAMINATIONS

| 3 PLIES OF EXTENSIBLE KRAFT | | | 2 PLIES OF EXTENSIBLE KRAFT | | | 1 PLY OF EXTENSIBLE KRAFT | | |
| --- | --- | --- | --- | --- | --- | --- | --- | --- |
| | | | 1 PLY OF LINERBOARD | | | 2 PLIES OF LINERBOARD | | |
| ply 1 | ply 2 | ply 3 | ply 1 | ply 2 | ply 3 | ply 1 | ply 2 | ply 3 |
| 70EK | 100EK | 70EK | 80EK | 26LB | 80EK | 26LB | 80EK | 26LB |
| 65EK | 95EK | 65EK | 75EK | 30LB | 75EK | 30LB | 75EK | 30LB |
| 70EK | 90EK | 70EK | 70EK | 33LB | 70EK | 33LB | 70EK | 33LB |
| 75EK | 85EK | 75EK | 65EK | 38LB | 65EK | 38LB | 65EK | 38LB |
| 80EK | 80EK | 80EK | 60EK | 42LB | 60EK | 42LB | 60EK | 42LB |
| 80EK | 75EK | 80EK | 55EK | 56LB | 55EK | 56LB | 55EK | 56LB |
| 80EK | 70EK | 80EK | 50EK | 69LB | 50EK | 69LB | 50EK | 69LB |
| 80EK | 65EK | 80EK | 80EK | 30HPLB | 80EK | 30HPLB | 80EK | 30HPLB |
| 80EK | 60EK | 80EK | 75EK | 33HPLB | 75EK | 33HPLB | 75EK | 33HPLB |
| 80EK | 55EK | 80EK | 70EK | 33HPLB | 70EK | 33HPLB | 70EK | 33HPLB |
| 80EK | 50EK | 80EK | 65EK | 33HPLB | 65EK | 33HPLB | 65EK | 33HPLB |
| | | | 60EK | 46HPLB | 60EK | 46HPLB | 60EK | 46HPLB |
| | | | 55EK | 52HPLB | 55EK | 52HPLB | 55EK | 52HPLB |
| | | | 50EK | 56HPLB | 50EK | 56HPLB | 50EK | 56HPLB |

EK - EXTENSIBLE KRAFT    (UNITS EXPRESSED IN POUNDS PER 3000 SQ. FT.)
LB - LINERBOARD    (UNITS EXPRESSED IN POUNDS PER 1000 SQ. FT.)
HPLB - HIGH PERFORMANCE LINERBOARD    (UNITS EXPRESSED IN POUNDS PER 1000 SQ. FT.)

NOTE:
The order or position of the plies when laminated is not critical.
The chart does not list all of the possible combinations or mean to limit the invention to those listed there.
There may be four or more plies in combination with extensible kraft, but 3 should be sufficient.

FIG. 4

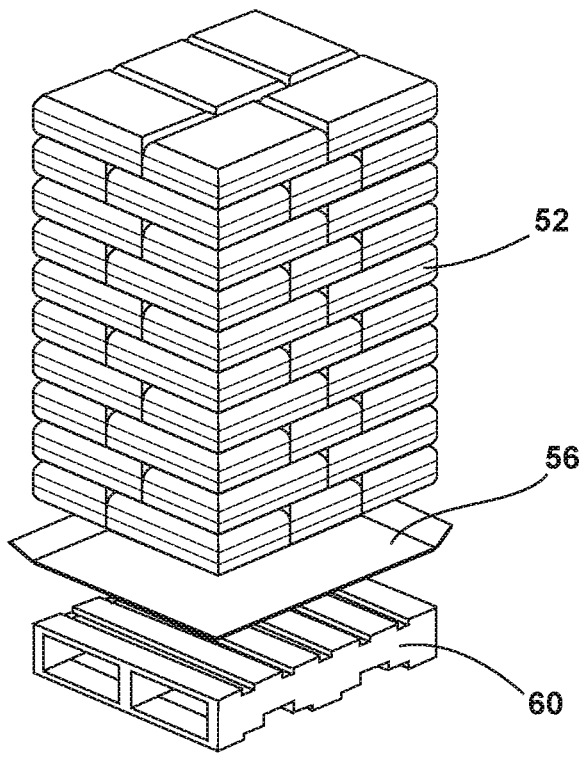
FIG. 8A
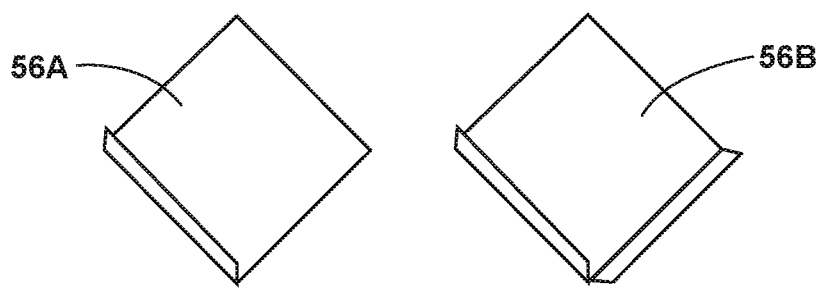
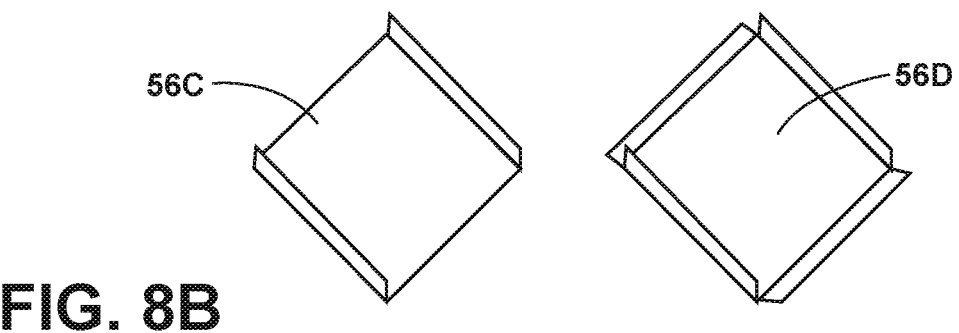
FIG. 8B

EXTENSIBLE PAPER LAMINATES AND THEIR USES

CROSS-REFERENCE TO RELATED APPLICATIONS

This application is a continuation-in-part of U.S. patent application Ser. No. 15/137,703, filed Apr. 25, 2016, entitled "BOX SPRING PACKAGING METHOD AND APPARATUS," which is herein incorporated by reference in its entirety. U.S. patent application Ser. No. 15/137,703 claims priority under 35 U.S.C. § 119(e) to U.S. Provisional Patent Application No. 62/179,166, filed Apr. 29, 2015, entitled "BOX SPRING PACKAGING METHOD AND APPARATUS," which is herein incorporated by reference in its entirety.

FIELD OF THE INVENTION

The present invention relates to improved packaging processes and packaging materials for packaging of innerspring mattress cores for shipping, and more particularly to the use of improved end panels and interleaving sheets for packaging multiple innerspring mattress cores together in a compressed bundle. The present invention additionally relates to extensible kraft paper laminates and the various applications these extensible kraft paper laminates can be used with.

BACKGROUND OF THE INVENTION

In the production of commercial innerspring mattresses, a metal coil innerspring "core" is covered with padding and a fabric cover. An innerspring core generally includes a plurality of laterally spaced coil spring elements connected together in a rectangular array to form a spring mat.

At the present time, most of the metal coil innerspring cores are made at one location by a single manufacturer and then shipped to various other customer locations for incorporation in finished mattresses. Mattress manufacturers generally have their own brands, styles, technical specifications, and inner spring constructions to meet consumer's specific tastes.

Shipping of spring cores from the core manufacturer to the mattress manufacturers presents a challenge, because the spring cores are flexible and mostly air and take up a substantial amount of space. A process for shipping mattress cores has been developed and has been in use for many (at least twenty) years. However, the evolution of this process over time has created numerous problems that have existed for many years, and these problems are continuing to get worse.

The current process for packaging spring cores involves placing an average of twelve cores in alignment on their edges within a horizontal hydraulic press so as to form a bale. A single sheet of core separator paper (called "interleaving paper") is positioned between each pair of spring cores in the bale in order to maintain the separation between adjacent spring core units when the cores are compressed together. Additionally, heavier laminated paper stock panels (referred to herein as "end panels") are placed on the exposed outer sides of the bale. At this time, up to three employees puncture the unit from one side of the cores to the other using fifteen foot spears (up to 40 spears total) as fast as they can, aligning the spears through the same hole locations in each of the individual innerspring cores. Spearing the bale is a critical part of the process, because without the spears to guide and hold the spring cores in alignment, the cores would slip sideways out of alignment during compression. The bale is then compressed to about a fifteen inch thick sandwich and is held together using wood braces and/or tie wires or banding during transit. The baled "crate" is generally under about 18,000 lbs. of pressure, so the packaging is very critical.

For many years, there were no standard specifications for the interleaving paper placed between the individual innerspring cores or for the end panels placed on the outer sides of the stack of innerspring cores. As in any business, the cost of packaging can be a major concern, especially in such a high volume and packaging intensive product line as this. Therefore, at first many manufacturers would use the least expensive material available, often odd lot or rejected papers from other applications, which came in many different types and combinations. The result for the end converter (i.e., the finished mattress manufacturer) was inconsistency, product damage, and a generally unsafe working environment. It was not uncommon to find that when a bale was opened the interleaving paper was shredded into little pieces. This would cause the innersprings to become entangled and need repair if not rejected outright; both an added cost for the manufacturer. Likewise, substandard laminated cardboard used for the end panels would break, allowing the springs to jut out and become deformed, thereby damaging them as well.

Approximately twenty-five years ago, standard specifications were created detailing the requirements for the interleaving paper and end panels used in this application. In the original specification, around 1990, the end panels were specified as a lamination of two layers of heavy paper called "linerboard" (which is a type of heavy paper stock used in the manufacture of corrugated cardboard boxes) having a basis weight of 42 pounds per 1000 square feet (sq. ft.) per layer (which provides a total of 84 pounds per 1000 square feet for the two layers). The interleaving material was specified as a single layer of paper stock known as "natural kraft paper" (which is commonly used for wrapping paper, sandwich liner, and food packaging) having a basis weight of 50 lbs. per 3000 sq. ft. (about 17 lbs. per 1000 sq. ft.) (lighter kraft papers such as these are generally specified in nominal units of pounds per 3000 square feet).

Over the years, innerspring compression strength increased substantially, so it became necessary to increase the strength of the interleaving and end panel materials.

Around the year 2000, end panels were first increased from their original 1990 construction, wherein the end panel on each end of the stack consisted of two laminated plies of 42 lb. linerboard, to a construction employing two layers of the two ply 42 lb. linerboard at each end of the stack. This was later reduced to a three ply lamination of 42 lb. linerboard in 2010. Presently, a four ply 42 lb. linerboard end panel is being considered for specific units that are having higher than normal failure rates due to pressure-related rupture.

Interleaving materials likewise have increased in basis weight (heavier, stronger), first in 1995 from one layer to two layers (not glued) of natural kraft paper having a basis weight of 50 pounds per 3000 sq. ft. Then a single layer of 26 lb. per 1000 sq. ft. linerboard was substituted for the two layers of natural kraft paper in 2000. This was increased to two layers of 26 pound linerboard in 2010. The current specification is one layer of 33 lb. linerboard. One layer of 42 lb. linerboard is projected for the future.

The increased thickness of the end panels and interleaving has created two problems, first an increase in shipping costs due to the increased weight of packaging material used, and second, increased difficulty in piercing the end panels and interleaving layers prior to compressing the coil spring mattresses. The difficulties in piercing existing and future thicknesses of materials and the expense of the materials make it undesirable to continue to increase the thickness of interleaving sheets and end panels as spring compression strength continues to increase.

An object of the present invention is to provide improved end panels, extensible kraft paper laminates, and interleaving materials for packaging innerspring mattresses for shipping so as to facilitate packaging and reduce shipping costs.

Another object of the present invention is to provide an improved process for packaging compressed innersprings using the improved end panels and interleaving.

SUMMARY OF THE INVENTION

The present invention provides in a first embodiment a package of compressed mattress spring coils having a plurality of mattress spring coils positioned in a stack having two end panels positioned on each end of an outer side of the stack wherein the stack is compressed and strapped in a compressed condition. The mattress spring coils are each separated by a piece of interleaving paper. The end panels include a laminated paper stack panel having at least one layer of an extensible kraft paper.

The present invention provides in a second embodiment a package of compressed mattress spring coils having a plurality of mattress spring coils positioned in a stack having two end panels positioned on each end of an outer side of the stack. The stack is compressed and strapped in a compressed condition. The mattress spring coils are each separated by a piece of interleaving paper including a layer of an extensible kraft paper.

The present invention provides in a third embodiment a process for packaging a plurality of mattress spring coils. One step is the positioning of the plurality of mattress spring coils in a stack with a piece of interleaving paper between each of the mattress spring coils. Another step is applying two end panels positioned on each end of an outer side of the stack. Another step is compressing and then strapping the plurality of mattress spring coils, the piece of interleaving paper, and the two end panels in a compressed condition. The end panels comprise a laminated paper stack panel including at least one layer of an extensible kraft paper having a basis weight of 35-150 pounds per 3000 sq. ft.

The present invention provides in a fourth embodiment a package of compressed mattress spring coils having a plurality of mattress spring coils positioned in a stack having two end panels positioned on each end of an outer side of the stack wherein the stack is compressed and strapped in a compressed condition. The mattress spring coils are each separated by a piece of interleaving paper. The end panels include a laminated paper stack panel having at least one layer of an extensible kraft paper. The laminated paper stack panel includes two layers of the extensible kraft paper, each layer of extensible kraft paper having a basis weight of 35-150 pounds per 3000 sq. ft., laminated with a water soluble glue to one layer of a linerboard having a basis weight of 10-90 pounds per 1000 sq. ft.

The present invention provides in a fifth embodiment a package of compressed mattress spring coils having a plurality of mattress spring coils positioned in a stack having two end panels positioned on each end of an outer side of the stack wherein the stack is compressed and strapped in a compressed condition. The mattress spring coils are each separated by a piece of interleaving paper. The end panels include a laminated paper stack panel having at least one layer of an extensible kraft paper. The laminated paper stack panel includes three layers of the extensible kraft paper, each layer of extensible kraft paper having a basis weight of 35-150 pounds per 3000 sq. ft.

The present invention provides in a sixth embodiment a laminated paper stack panel including one or more layers of an extensible kraft paper and one or more layers of a non-extensible kraft paper. The extensible kraft paper has a basis weight of 25-200 pounds per 3000 sq. ft. and the layers can be laminated with a glue. The laminated paper stack panel can have a thickness of 0.500 inches or less and can exhibit a mullen of at least 125 psi. Some non-limiting uses for these laminated paper stack panels can include a sleeve, a reel wrap, a slip sheet, a carrying crate, a drum, a fiber drum, a food carton, a medical carton, a box for trash, a furniture back panel, a sheathing board, a military packaging box, and/or a variety of other packaging or storage devices.

The present invention provides in a seventh embodiment an extensible kraft paper laminate including a layer of an extensible kraft paper and at least one layer of a non-extensible kraft paper or one or more additional layers of the extensible kraft paper. The extensible kraft paper can have a basis weight of 25-200 pounds per 3000 sq. ft. and the layers can be laminated. The extensible kraft paper laminate can have a thickness of 0.500 inches or less and can exhibit a mullen of at least 125 psi. Some non-limiting uses for these extensible kraft paper laminates can include a sleeve, a reel wrap, a slip sheet, a carrying crate, a drum, a fiber drum, a food carton, a medical carton, a box for trash, a furniture back panel, a sheathing board, a military packaging box, and/or a variety of other packaging or storage devices.

These constructions do not preclude the use of additional layers of material if such is desired, but additional layers should not be necessary at the present time and could reduce some of the benefits of the preferred construction.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a chart showing various alternative end panel constructions feasible in the present invention;

FIG. 8A is a perspective view of a slip sheet used in loading;

FIG. 8B is a perspective view of different slip sheets having various edges;

DETAILED DESCRIPTION

Figure 1:
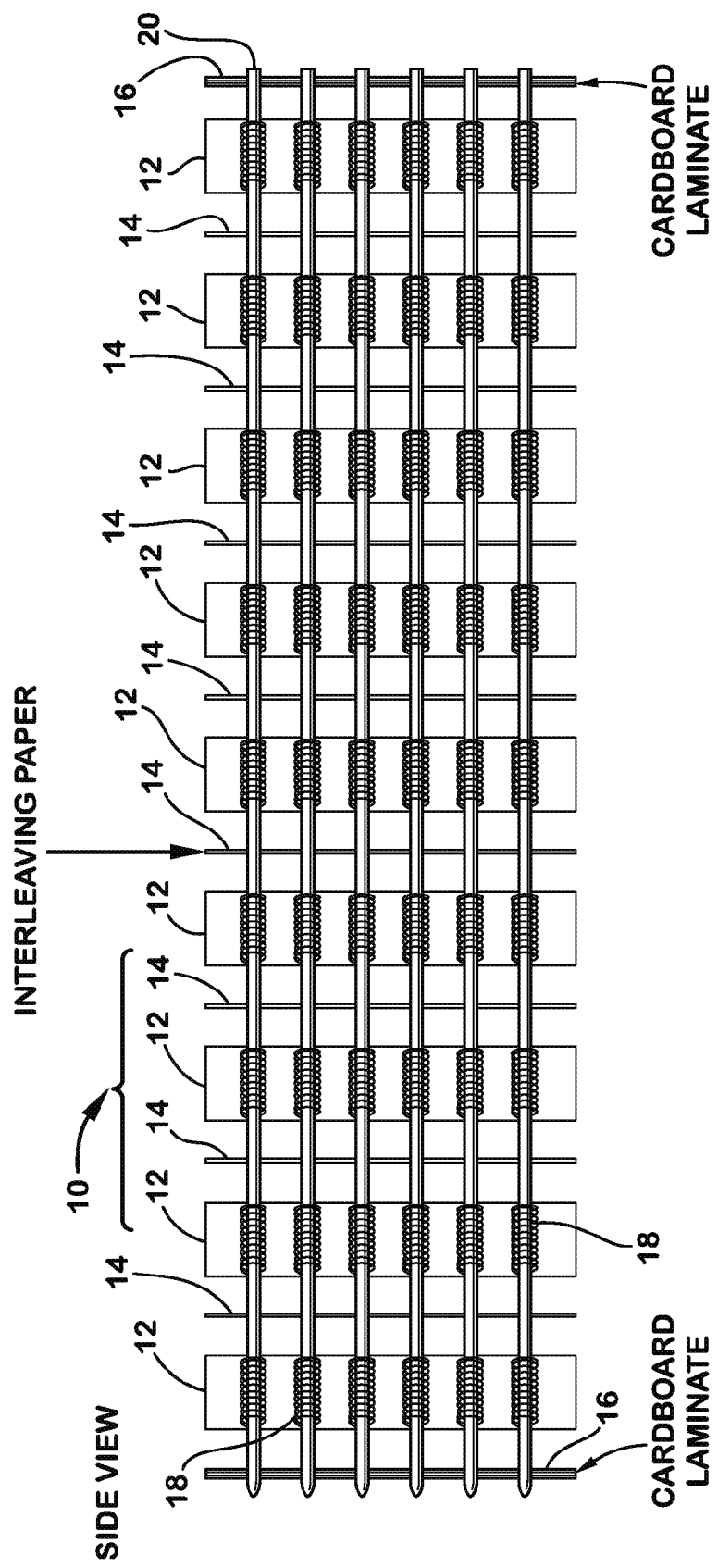
FIG. 1 is a schematic side view of a stack of mattress coil springs separated by interleaving sheets prior to being compressed together.

Referring to the drawings, FIG. 1 shows a stack 10 of mattress spring cores 12 or mattress spring coils 12 separated by interleaving paper 14 and having end panels 16 on the outer ends of the stack. The individual mattress spring cores 12 each comprise a plurality of spaced coil spring elements 18 fastened together to form a spring coil mat. The coils 18 in overlapping mattress cores 12 are in general alignment.

The stack 10 or plurality of mattress spring coils 12 can comprise 4-15 mattress spring coils, 6-12 mattress spring coils, 8-10 mattress spring coils, about 6 mattress spring coils, about 7 mattress spring coils, about 8 mattress spring coils, about 9 mattress spring coils, about 10 mattress spring coils, about 11 mattress spring coils, or about 12 mattress spring coils.

The term "extensible kraft paper", as used herein refers to fully extensible kraft paper, semi-extensible kraft paper, and any other specialty grades of extensible kraft paper made with high energy absorption properties known to one with ordinary skill in the art. In addition, "extensible kraft paper", as used herein can be synonymously referred to as crepe paper, creped paper, stretchy paper, embossed paper, and/or crinkled paper. Semi-creped, primary creped, or machine-creped paper can be produced with a doctor blade on a paper machine and the resultant percentage of crepe can be low. Wet crepe and rubber belt machines rely on aqueous and/or steam processes in a secondary converting operation where the paper is moistened and passed over a roll equipped with a doctor blade. The process of crowding a sheet of paper on a roll using a doctor blade can produce an effect simulating crepe whereas extremely high percentages of crepe can also be achieved by this process. Depending on the fabrication and modifications of the roll equipped with the doctor blade, the process can permit cross-directional creping and/or diagonal creping, sometimes called an all-directional stretch. Dry creping is a process in which a dry sheet is removed from a Yankee drier by a doctor blade and/or by means of a microcreping process.

The term "linerboard", as used herein refers to linerboard, natural kraft paper, high performance linerboard, and any other specialty grades of linerboard known to one with ordinary skill in the art.

In one embodiment, the interleaving paper 14 is a single layer or piece of extensible kraft paper having a basis weight of 35-150 pounds per 3000 sq. ft. In another embodiment, the interleaving paper can be two layers of non-laminated extensible kraft paper, each layer or piece of extensible kraft paper having a basis weight of 35-150 pounds per 3000 sq. ft. In another embodiment, the interleaving paper can be three or more layers or pieces of non-laminated extensible kraft paper, each layer or piece of extensible kraft paper having a basis weight of 35-150 pounds per 3000 sq. ft.

In some embodiments, the extensible kraft paper may have a basis weight of 30-150 pounds per 3000 sq. ft. In other embodiments, the extensible kraft paper may have a basis weight of 50-100 pounds per 3000 sq. ft. In other embodiments, the extensible kraft paper may have a basis weight of 50-75 pounds per 3000 sq. ft. In other embodiments, the extensible kraft paper may have a basis weight of about 50 pounds per 3000 sq. ft., about 55 pounds per 3000 sq. ft., about 60 pounds per 3000 sq. ft., about 65 pounds per 3000 sq. ft., about 70 pounds per 3000 sq. ft., or about 75 pounds per 3000 sq. ft.

Figure 2:
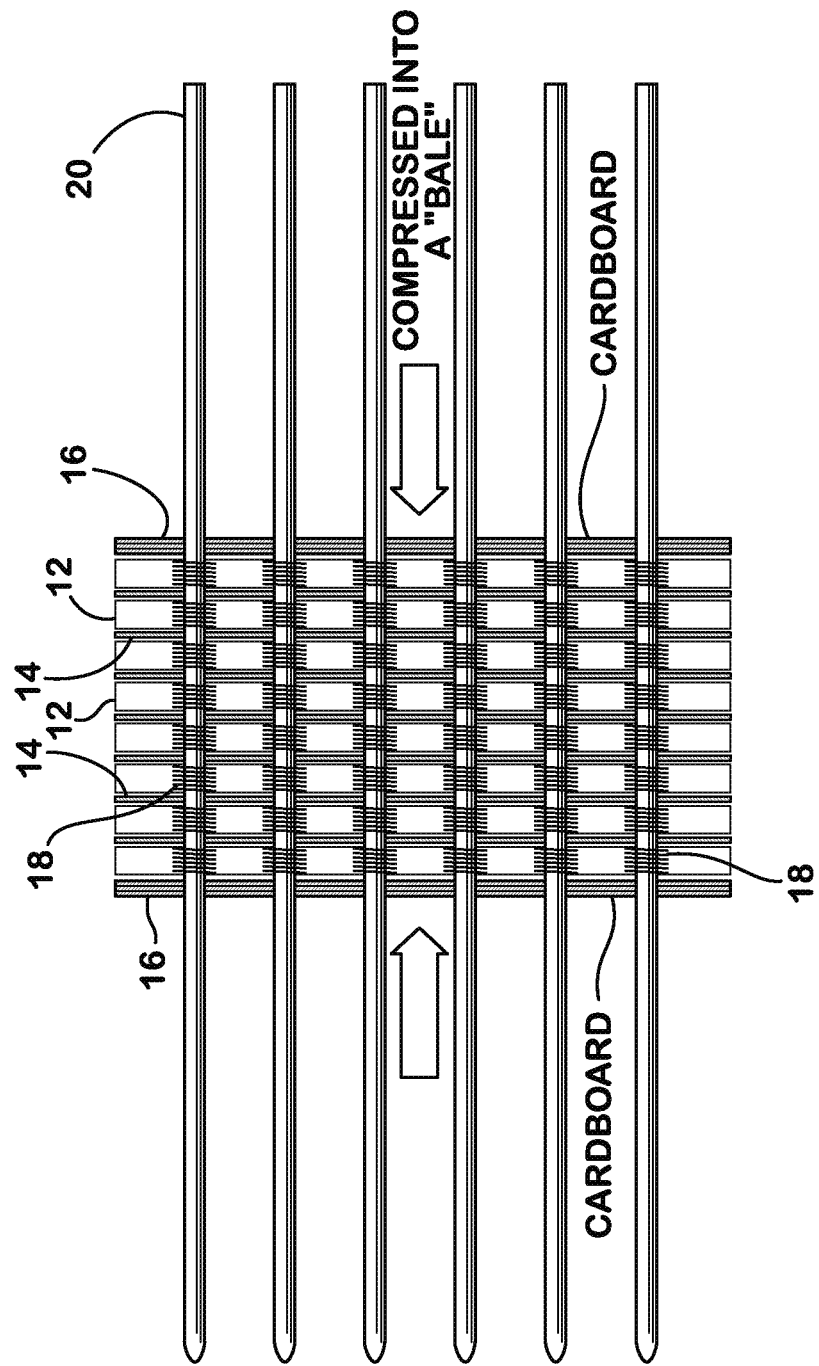
FIG. 2 is a schematic side view showing a compressed stack of mattress cores separated by interleaving sheets and having end panels on the outer sides thereof and being bound together in compressed form for shipping.
Figure 3:
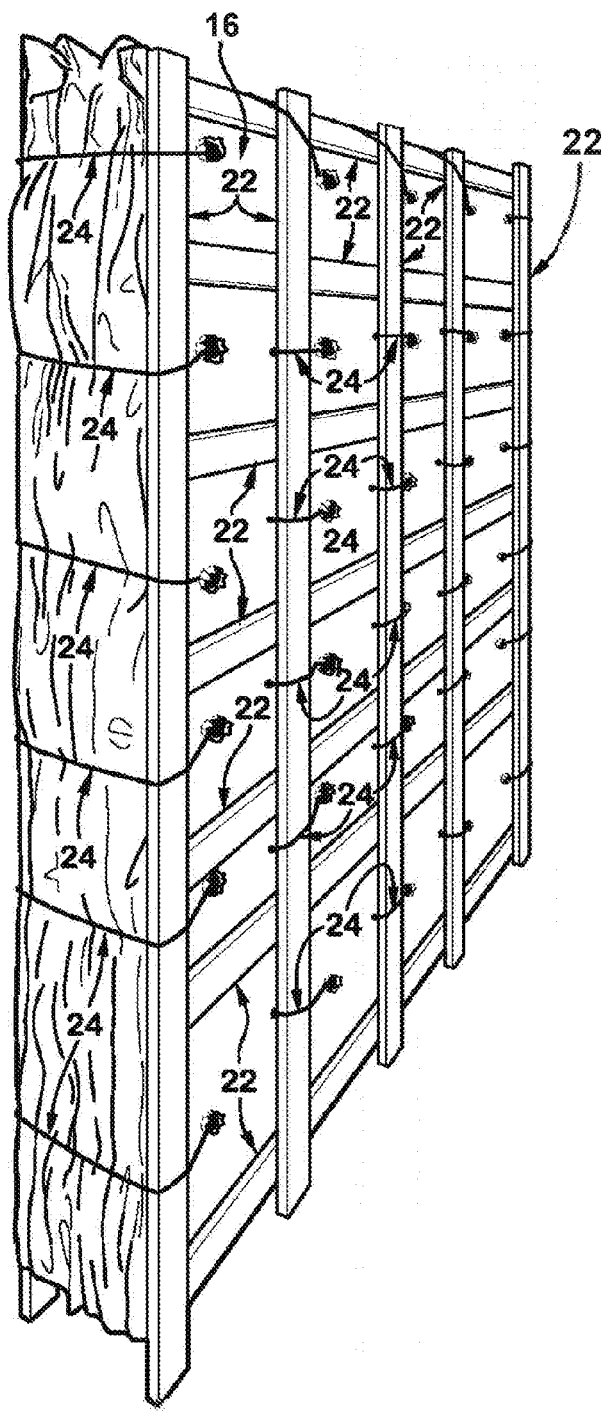
FIG. 3 is a perspective view showing the compressed and bound stack of mattress cores.

After the stack 10 of mattress cores 12 has been formed with the interleaving papers 14 and end panels 16 in place, a plurality of spears 20 (FIG. 2) are inserted through the coils 18 and through the end panels 16 and interleaving sheets 14 in order to hold the coils in alignment for compression. The coils 18 are shown in their uncompressed state in FIG. 1. Wood boards of panels 22 (FIG. 3) are then placed against the outer sides of the stack 10 and the stack 10 is compressed in a press, generally a horizontal hydraulic press. The mattress spring cores 12 are shown in a compressed bundle in FIG. 2. When the bundle of mattress spring cores 12 and coil spring elements 18 are fully compressed, the bundle is bound together in the compressed state by conventional bands, straps, or tie wires 24 (FIG. 3). The bundle is thereafter shipped to its destination, where the mattress spring cores 12 are then unbundled and decompressed, and the individual mattress spring cores 12 are thereafter covered with padding and fabric in order to complete the mattress construction.

One important feature of the present invention is that the end panels 16 positioned on the outer sides of the stacks are relatively thin, easily pierceable members formed of a lamination or a laminated paper stack panel having at least one and up to three layers of extensible kraft paper laminated together with water soluble glue. Other types of glue known in the art for adhering paper layer may be used. The use of "extensible" kraft paper instead of the conventional linerboard is important. Extensible kraft paper is a specific type of relatively thin paper that has been subjected to additional processing during manufacture that makes the paper somewhat stretchable. This type of paper is generally used in cement bag or bag applications with a single ply or two plies of a non-laminated paper which benefits from being somewhat stretchable. Generally, extensible kraft paper is not used in laminated paper products. The stretchability and thinness of extensible kraft papers generally make them undesirable for use in laminated paper products, because thin and stretchy paper cannot be used in known automated laminating machinery and can only be processed in smaller batches. Notwithstanding the increased material cost on a unit weight basis and notwithstanding the added manufacturing cost of a non-automated laminating process, the use of laminated extensible kraft paper in the end panels provides cost savings and performance benefits in the present invention. Likewise, the use of extensible kraft paper for the interleaving paper provides desirable strength and tear resistance while retaining desirable pierce-ability attributes.

While some embodiments of the present invention employ end panels 16 formed of three layers of extensible kraft paper laminated together with a water soluble glue, other constructions are feasible. For example, the end panels can be formed by gluing two layers of extensible kraft paper with one layer of linerboard, or the end panels can be formed by gluing one layer of extensible kraft paper with two layers of linerboard. Multiple examples of feasible laminate constructions are shown in FIG. 4. FIG. 4 is not meant to be limiting since other combinations of laminate layers in light of this disclosure could be determined.

When the laminated end panels or laminated paper stack panel includes three layers of extensible kraft paper, the individual weights of the three different paper layers may all vary. As shown in FIG. 4, the first layer or ply of the three layers of extensible kraft paper can have a basis weight of 35-150 pounds per 3000 sq. ft. In some embodiments the first ply can have a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The second layer or ply of the three layers of extensible kraft paper can have a basis weight of 35-150 pounds per 3000 sq. ft. In some embodiments the second ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., a basis weight of about 80 pounds per 3000 sq. ft., a basis weight of about 85 pounds per 3000 sq. ft., a basis weight of about 90 pounds per 3000 sq. ft., a basis weight of about 95 pounds per 3000 sq. ft., or a basis weight of about 100 pounds per 3000 sq. ft. The third layer or ply of the three layers of extensible kraft paper can have a basis weight of 35-150 pounds per 3000 sq. ft. In some embodiments the third ply can have a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft.

When the laminated end panels or laminated paper stack panel comprises two layers of extensible kraft paper and one layer of linerboard, the individual weights of the three different layers may all vary. As shown in FIG. 4, the first layer or ply of extensible kraft paper can have a basis weight of 35-150 pounds per 3000 sq. ft. In some embodiments the first ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The second layer or ply made of linerboard can have a basis weight of 10-90 pounds per 1000 sq. ft. In some embodiments the second ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 pounds per 1000 sq. ft. The third layer or ply of extensible kraft paper can have a basis weight of 35-150 pounds per 3000 sq. ft. In some embodiments, the third ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft.

When the laminated end panels or laminated paper stack panel comprises one layer of extensible kraft paper and two layers of linerboard, the individual weights of the three different layers may all vary. As shown in FIG. 4, the first layer or ply of linerboard can have a basis weight of 10-90 pounds per 1000 sq. ft. In some embodiments the first ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 pounds per 1000 sq. ft. The second layer or ply of extensible kraft paper can have a basis weight of 35-150 pounds per 3000 sq. ft. In some embodiments, the second ply can have a basis weight of about 50 pounds per 3000 sq. ft., a basis weight of about 55 pounds per 3000 sq. ft., a basis weight of about 60 pounds per 3000 sq. ft., a basis weight of about 65 pounds per 3000 sq. ft., a basis weight of about 70 pounds per 3000 sq. ft., a basis weight of about 75 pounds per 3000 sq. ft., or a basis weight of about 80 pounds per 3000 sq. ft. The third layer or ply of linerboard can have a basis weight of 10-90 pounds per 1000 sq. ft. In some embodiments the third ply can have a basis weight of about 26 pounds per 1000 sq. ft., a basis weight of about 30 pounds per 1000 sq. ft., a basis weight of 33 pounds per 1000 sq. ft., a basis weight of 38 pounds per 1000 sq. ft., a basis weight of 42 pounds per 1000 sq. ft., a basis weight of 56 pounds 1000 sq. ft., or a basis weight of 69 per 1000 sq. ft.

The laminated end panels or laminated paper stack panel are made of paper layers having extensible kraft paper and/or layers of linerboard. The strength and/or weight of the laminated end panels or laminated paper stack is normally the cumulative value of the individual layers laminated together plus any residual strength or weight added by the glue. For example, a single layer of extensible kraft paper having a basis weight of 100 pounds per 3000 sq. ft. laminated with a single layer of linerboard having a basis weight of 270 pounds per 3000 sq. ft. would yield a laminated end panel or laminated paper stack panel of 370 pounds per 3000 sq. ft.

In some embodiments, the ordering or layering of the individual layers in the laminated end panels or laminated paper stack panels do not matter. For example, if the laminated paper stack panel includes two layers of an extensible kraft paper and one layer of a linerboard, the layering could be the linerboard sandwiched between the two extensible kraft paper layers or the layering could be a layer of extensible kraft paper on top of a layer of extensible kraft paper with the layer of linerboard added last to the top or bottom. In some embodiments, the ordering or layering of the individual layers in the laminated end panels or laminated paper stack panels are not limiting and may be in any order.

In one embodiment of the invention, the laminated end panels each include three layers of extensible kraft paper, each layer of extensible kraft paper having a basis weight of 35-150 pounds per 3000 square feet.

In another embodiment, the end panels include a laminated paper stack panel of at least one and up to two layers of extensible kraft paper, each layer of extensible kraft paper having a basis weight of 35-150 pounds per 3000 sq. ft., in combination with a layer of linerboard having a basis weight of 10-90 pounds per 1000 sq. ft.

In another embodiment, the end panels include a laminated paper stack panel of one layer of extensible kraft paper having a basis weight of 35-150 pounds per 3000 sq. ft. in combination with two layers of linerboard, each layer of linerboard having a basis weight of 10-90 pounds per 1000 sq. ft.

Mullen is a measure of the bursting strength of paper or paperboard. In a Mullen test (also called a pop or burst test), the paper sample is placed between two ring-like clamps in a device called a Mullen tester, and hydraulic pressure is used to inflate a rubber diaphragm, which expands against the sample stretching it. The measure of the total hydraulic pressure expanding the diaphragm at the time the sample ruptures (usually expressed in either pounds per square inch or kilopascals) is its bursting strength. Mullen tests are performed for each side of a paper or paperboard, and the bursting strength can be expressed as the average of both sides.

In one embodiment, the laminated paper stack panel has a mullen from 100 psi to 800 psi. In another embodiment, the laminated paper stack panel has a mullen from 200 psi to 600 psi. In another embodiment, the laminated paper stack panel has a mullen from 300 psi to 500 psi. In another embodiment, the laminated paper stack panel has a mullen from 250 psi to 400 psi. In another embodiment, the laminated paper stack panel has a mullen of about 300 psi, about 350 psi, about 400 psi, about 450 psi, or about 500 psi.

In one embodiment, the interleaving paper has a mullen from 30 psi to 270 psi. In another embodiment, the interleaving paper has a mullen from 50 psi to 175 psi. In another embodiment, the interleaving paper has a mullen from 70 psi to 100 psi.

Figure 5:
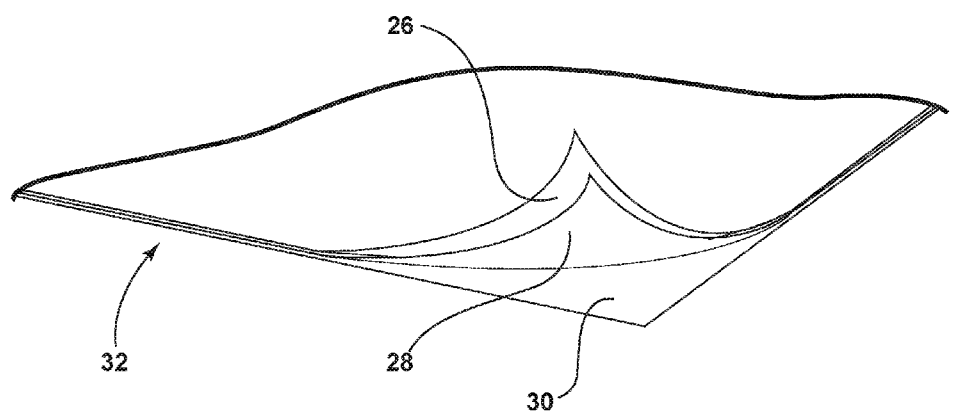
FIG. 5 is a perspective view of an extensible kraft paper laminate.

Referring now to FIG. 5, an extensible kraft paper laminate 32 is shown. The extensible kraft paper laminate 32 shown and described in FIG. 5 is synonymous with the laminated paper stack described above. For example, each of the layering options disclosed above and in FIG. 4, in addition to the properties described for the laminated paper stack should be considered descriptive for the extensible kraft paper laminate 32. The term, "extensible kraft paper laminate 32", as used herein, is defined to mean laminated paper stack as described herein but is used to be more descriptive for a reader. The extensible kraft paper laminate 32 may include a first layer 26, a second layer 28, and a third layer 30. The three layers as shown in FIG. 5 may correspond to any of the respective plys shown and listed in FIG. 4. For example, the three layers 26, 28, 30 may include three plys of extensible kraft paper, two plys of extensible kraft paper and one layer of linerboard, or one ply of extensible kraft paper and two plys of linerboard. The number, arrangement, and thickness of the various layers/plys may be varied depending on the desired application and use as disclosed herein. For the many example embodiments that follow, example laminates having a variety of different layers wherein at least one layer includes an extensible kraft paper are provided and shown. In some embodiments, the extensible kraft paper laminates 32 disclosed herein are each defined to be a full coverage lamination or a partial coverage lamination.

The laminated paper stack panel and/or extensible kraft paper laminate 32 each contain one or more layers of the extensible kraft paper. The advantages of using extensible kraft paper in laminated paper stack panels and/or extensible kraft paper laminates 32 include a reduction in thickness, a reduction in weight, an improvement in racking, an improvement in a nail pull resistance through the laminated paper stack panel and/or the extensible kraft paper laminate 32, an improvement in a nail tear resistance horizontally and/or vertically through the edges of the laminated paper stack panel and/or the extensible kraft paper laminate 32 in addition to improved material properties such as strength measured by mullen, tensile strength (machine direction MD and cross direction CD), and stretching abilities. The ability to have thinner laminated paper stack panels and/or extensible kraft paper laminates 32 with better material properties that also weigh less provides manufacturers, developers, and consumers with the ability to save money on shipping while developing new products that use less raw materials, weigh less, and have better durability.

The extensible kraft paper used to fabricate the laminated paper stack panel and/or extensible kraft paper laminate 32 can be combined with a variety of other paper, non-paper, and/or board layers as described herein and in FIG. 4. For example, other types of paper that can be laminated or coupled with extensible kraft paper include, but are not limited to, chipboard, linerboard, container board, recycled linerboard, gypsum board, fine paper, boxboard (folding or setup, fiberboard, container chip, bending chip, plain chip, manila lined, clay coated news board, solid bleached, unbleached kraft), natural kraft paper, coated or uncoated offset paper or coating base stock, and cardstock. Depending on the type of paper used, the thickness, density, and/or basis weight can each be selected from any value known or used by those skilled in the art. For example, chipboard can be selected based on its thickness and/or density. The thickness of chipboard can range from about 0.001 inches to about 0.070 inches. Any thickness of chipboard to the thousandth of an inch could be used in this range by those making the disclosed laminated paper stack panels and/or extensible kraft paper laminates 32. Additionally, chipboard can be selected based on its density; the density of chipboard is a factor known by those skilled in the art ranging from about 2.1 to about 4.5 (paper density is its mass per unit volume. As defined by ISO 534.2011, paper and board—determination of thickness, density and specific volume, indicates it is expressed in grams per cubic centimeter. The density can be calculated by dividing the grammage of paper by its caliper), where any density of chipboard to a tenth or even hundredth of a unit could be used in this range by those making the disclosed laminated paper stack panels and/or extensible kraft paper laminates 32. Depending on the application and/or product, the laminated paper stack panels and/or extensible kraft paper laminates 32 can include 2, 3, 4, 5, 6, 7, or more layers/plys of paper including at least one layer of extensible kraft paper. In some embodiments, the 2, 3, 4, 5, 6, 7, or more layers/plys of the laminated paper stack panels and/or extensible kraft paper laminates 32 can all be extensible kraft paper. In other embodiments, the 2, 3, 4, 5, 6, 7, or more layers/plys of the laminated paper stack panels and/or extensible kraft paper laminates 32 can include at least two layers of extensible kraft paper and the remaining layers/plys can be any combination of extensible kraft paper and/or non-extensible kraft paper.

In some embodiments, the laminated paper stack panel and/or extensible kraft paper laminates 32 and the embodiments disclosed herein can have a mullen from about 100 psi to about 2000 psi. In other embodiments, the laminated paper stack panel and/or extensible kraft paper laminate 32 can have a mullen from about 200 psi to about 1800 psi. In still other embodiments, the laminated paper stack panel and/or extensible kraft paper laminate 32 can have a mullen from about 300 psi to about 1600 psi. In other embodiments, the laminated paper stack panel and/or extensible kraft paper laminate 32 can have a mullen from about 400 psi to about 1400 psi. In additional embodiments, the laminated paper stack panel and/or extensible kraft paper laminate 32 can have a mullen from about 600 psi to about 1200 psi. In other embodiments, the laminated paper stack panel and/or extensible kraft paper laminate 32 can have a mullen from about 800 psi to about 1000 psi. In some embodiments, the laminated paper stack panel and/or extensible kraft paper laminate 32 can have a mullen of at least 125 psi, at least 200 psi, at least 300 psi, at least 350 psi, at least 400 psi, at least 450 psi, at least 500 psi, at least 550 psi, at least 600 psi, at least 650 psi, at least 700 psi, at least 800 psi, at least 1000 psi, at least 1200 psi, at least 1400 psi, at least 1600 psi, at least 1800 psi, or at least 2000 psi.

In some embodiments, the laminated paper stack panel and/or extensible kraft paper laminates 32 and their use in the embodiments disclosed herein can have a thickness from about 0.005 inches to about 0.500 inches, from about 0.010 inches to about 0.400 inches, from about 0.020 inches to about 0.300 inches, from about 0.030 inches to about 0.250 inches, from about 0.040 inches to about 0.200 inches, from about 0.050 inches to about 0.150 inches, from about 0.060 inches to about 0.100 inches, or from about 0.075 inches to about 0.350 inches. In other embodiments, the laminated paper stack panel and/or extensible kraft paper laminate 32 and the embodiments disclosed herein can have a thickness of about 0.500 inches or less, about 0.450 inches or less, about 0.400 inches or less, about 0.350 inches or less, about 0.300 inches or less, about 0.250 inches or less, about 0.240 inches or less, about 0.200 inches or less, about 0.180 inches or less, about 0.150 inches or less, about 0.120 inches or less, about 0.100 inches or less, about 0.050 inches or less, about 0.040 inches or less, about 0.030 inches or less, or about 0.020 inches or less.

In some embodiments, the laminated paper stack panel and/or the extensible kraft paper laminates 32 and their respective uses in the embodiments disclosed herein can have basis weights (a means of calculating a paper weight shown here as pounds per 1000 square feet), from about 20 pounds per 1000 sq. ft. to less than about 2250 lbs per 1000 sq. ft., from about 30 pounds per 1000 sq. ft. to less than about 2000 pounds per 1000 sq. ft., from about 40 pounds per 1000 sq. ft. to less than about 1800 pounds per 1000 sq. ft., from about 50 pounds per 1000 sq. ft. to less than about 1600 pounds per 1000 sq. ft., from about 60 pounds per 1000 sq. ft. to less than about 1400 pounds per 1000 sq. ft., from about 80 pounds per 1000 sq. ft. to less than about 1300 pounds per 1000 sq. ft., from about 100 pounds per 1000 sq. ft. to less than about 1200 pounds per 1000 sq. ft., from about 200 pounds per 1000 sq. ft. to less than about 1000 pounds per 1000 sq. ft., from about 400 pounds per 1000 sq. ft. to less than about 800 pounds per 1000 sq. ft., from about 500 pounds per 1000 sq. ft. to less than about 600 pounds per 1000 sq. ft., less than about 30 pounds per 1000 sq. ft. to about 20 pounds per 1000 sq. ft., or less than about 2250 pounds per 1000 sq. ft., less than about 2000 pounds per 1000 sq. ft., less than about 1800 pounds per 1000 sq. ft., less than about 1600 pounds per 1000 sq. ft., less than about 1400 pounds per 1000 sq. ft., less than about 1200 pounds per 1000 sq. ft., less than about 1000 pounds per 1000 sq. ft., less than about 800 pounds per 1000 sq. ft., less than about 600 pounds per 1000 sq. ft., less than about 400 pounds per 1000 sq. ft., less than about 200 pounds per 1000 sq. ft., less than about 100 pounds per 1000 sq. ft., less than about 80 pounds per 1000 sq. ft., less than about 60 pounds per 1000 sq. ft., less than about 50 pounds per 1000 sq. ft., or less than about 40 pounds per 1000 sq. ft.

In some embodiments, the extensible kraft paper used to make the laminated paper stack panel and/or the extensible kraft paper laminates 32 can have a basis weight of 20-200 pounds per 3000 sq. ft., 25-200 pounds per 3000 sq. ft., 35-200 pounds per 3000 sq. ft, 35-150 pounds per 3000 sq. ft., 25-150 pounds per 3000 sq. ft. In other embodiments, the extensible kraft paper may have a basis weight of 25-100 pounds per 3000 sq. ft. In other embodiments, the extensible kraft paper may have a basis weight of 25-75 pounds per 3000 sq. ft. In other embodiments, the extensible kraft paper may have a basis weight of about 25 pounds per 3000 sq. ft., about 35 pounds per 3000 sq. ft., about 50 pounds per 3000 sq. ft., about 55 pounds per 3000 sq. ft., about 60 pounds per 3000 sq. ft., about 65 pounds per 3000 sq. ft., about 70 pounds per 3000 sq. ft., or about 75 pounds per 3000 sq. ft. In other embodiments, the non-extensible kraft paper used to make the laminated paper stack panel and/or the extensible kraft paper laminates 32 can have a basis weight of 10-90 pounds per 1000 sq. ft., 10-200 pounds per 1000 sq. ft., 10-500 pounds per 1000 sq. ft., or 10-2250 pounds per 1000 sq. ft.

Figure 6:
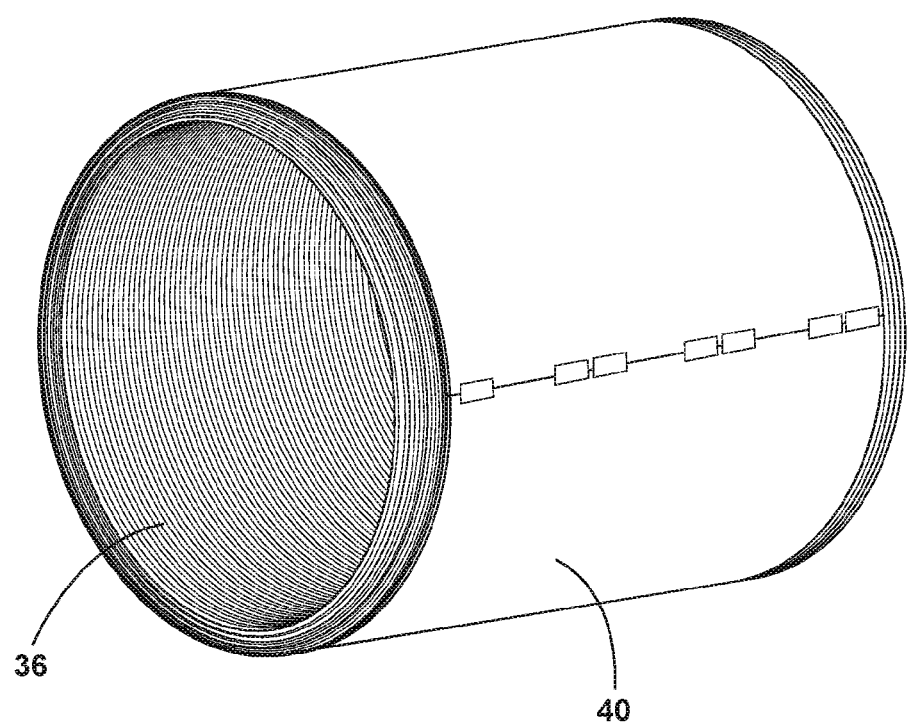
FIG. 6 is a perspective view of a sleeve for wire.

Referring now to FIG. 6, a sleeve 40 is shown wrapped around a coil of wire 36 for packaging and shipment. In some embodiments, the sleeve 40 can be used to wrap around any metal or coiled product. The sleeve 40 used to package the wire 36 can be the laminated paper stack panel and/or the extensible kraft paper laminate 32 and may include, for example, any of the disclosed combinations listed and shown in FIG. 4 plus other combinations depending on the application and embodiments disclosed herein.

Figure 7:
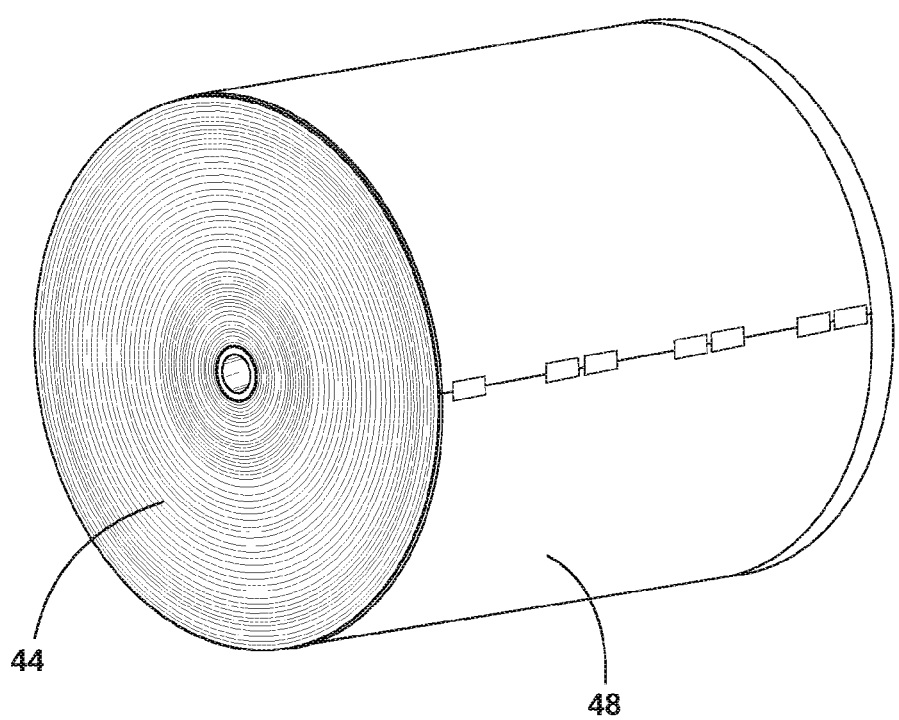
FIG. 7 is a perspective view of a reel wrap.

Referring now to FIG. 7, a wrap 48 is shown wrapped around and covering a roll of paper 44. In some embodiments, the wrap 48 can be used to wrap around any paper or rolled product that needs to be protected during storage or transportation. The wrap 48 used to package the paper 44 can be the laminated paper stack panel and/or extensible kraft paper laminate 32 and may include, for example, any of the disclosed combinations listed and shown in FIG. 4 plus other combinations depending on the application and embodiments disclosed herein.

Referring now to FIGS. 8A-8B, a slip sheet 56 is shown being used in loading applications. In FIG. 8A, for example, the slip sheet 56 is shown positioned between a pallet 60 and a plurality of loading bags 52. Once the loading bags 52 are loaded onto the pallet 60, a user may pull on the slip sheet 56 to pull the load or load bags 52 off of the pallet 60. As shown in FIG. 8B, the slip sheet 56 may have one or more flaps used to pull the slip sheet 56 and the corresponding load 52 off of the pallet 60 or shipping surface. Several different types of slip sheets 56 may be used, for example, FIG. 8B shows the slip sheet 56 may have a single flap 56A, a close-double flap 56B, an adjoining-double flap 56C, and/or a four-flap 56D slip sheet. Other embodiments of 56A, 56B, 56C, and 56D may include clipped corners or edges of the flap to prevent overlap, now shown, but do not depart from the spirit of this device. In some embodiments, the machine direction (MD) tensile strength and/or the cross machine (CD) tensile strength may improve by at least 100%, by at least 80%, by at least 60%, by at least 50%, by at least 40%, by at least 25%, by at least 20%, by at least 10% or by at least 5% as measured by, for example, TAPPI-T494 Tensile Properties of Paper and Paperboard. The slip sheet 56 can be fabricated from the laminated paper stack panel and/or extensible kraft paper laminate 32 and may include, for example, any of the disclosed combinations listed and shown in FIG. 4 plus other combinations depending on the application and embodiments disclosed herein.

Figure 9:
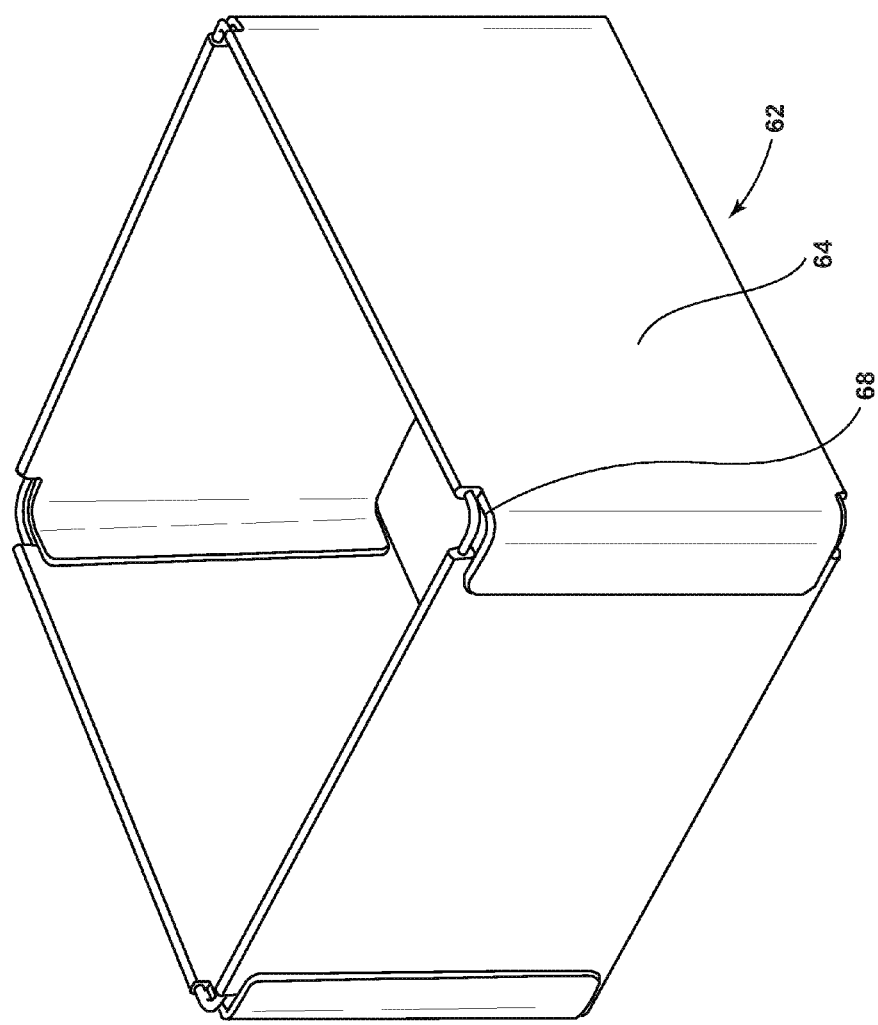
FIG. 9 is a perspective view of a carrying crate.

Referring now to FIG. 9, a carrying crate 62 is shown constructed from a plurality of crate walls 64 and a metal frame/support 68. In some embodiments, the carrying crate 62 may not use a metal frame/support 68 and may be alternately glued, stapled, fastened, or coupled by other known means of paper adhesion known in the art. The carrying crate 62 may be used to load food, cans, mail, or any other number of small units needing to be moved. The crate walls 64 used to enclose the metal frame/support 68 and/or to form the carrying crate 62 can be fabricated from the laminated paper stack panel and/or extensible kraft paper laminate 32 and may include, for example, any of the disclosed combinations listed and shown in FIG. 4 plus other combinations depending on the application and embodiments disclosed herein.

Figure 10:
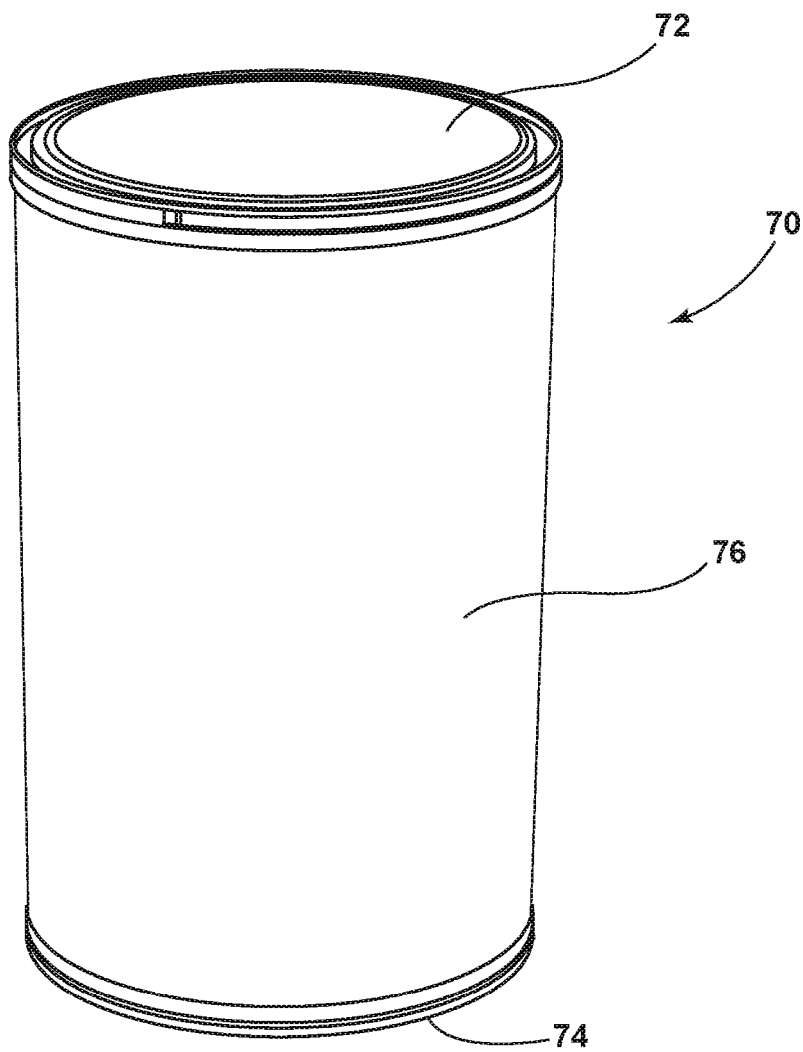
FIG. 10 is a perspective view of a fiber drum.

Referring now to FIG. 10, a fiber drum 70 is shown having a top 72, a bottom 74, and a drum wall 76 used to transport dry or liquid products in bulk. In some embodiments, the top 72, the bottom 74, and the drum wall 76 can be fabricated using the laminated paper stack panel and/or extensible kraft paper laminate 32 and may have a metal locking mechanism to couple the top 72 or bottom 74 in place. In some embodiments, one or more of the components of drum 70 such as the top 72, the bottom 74, and the drum wall 76 can be fabricated using the laminated paper stack panel and/or extensible kraft paper laminate 32 and may include, for example, any of the disclosed combinations listed and shown in FIG. 4 plus other combinations depending on the application and embodiments disclosed herein.

In some embodiments, the fiber drum 70, drum top 72, and drum bottom 74 may have a thickness from about 0.220 inches to about 0.250 inches and a minimum mullen of 1200 psi, a thickness from about 0.200 inches to about 0.220 inches and a minimum mullen of 1100 psi, a thickness of about 0.160 inches to about 0.200 inches and a minimum mullen of 1000 psi, a thickness of about 0.140 inches to about 0.160 inches and a minimum mullen of 1000 psi, a thickness of about 0.120 inches to about 0.140 inches and a minimum mullen of 900 psi, a thickness of about 0.100 inches to about 0.120 inches and a minimum mullen of 800 psi. In other embodiments, the laminated paper stack panel and/or the extensible kraft paper laminate 32 used to form the drum wall 76, drum top 72, and/or drum bottom 74 can have a mullen of at least 1200 psi, at least 1100 psi, at least 1000 psi, at least 900 psi, at least 800 psi, at least 700 psi, or at least 500 psi.

Figure 11A:
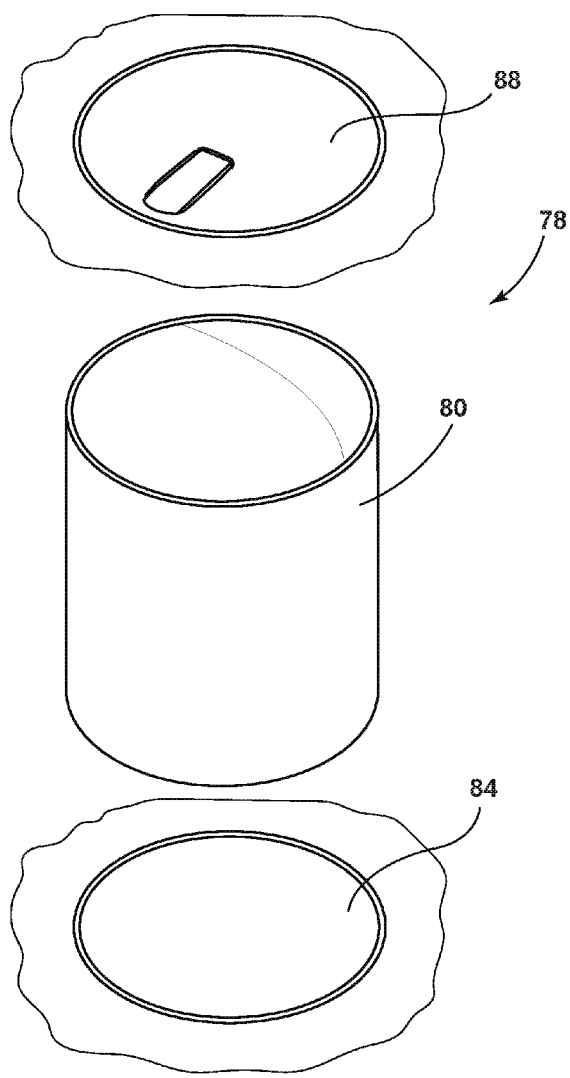
FIG. 11A is a perspective view of a disassembled fiber drum and a fiber top, bottom and wall.
Figure 11B:
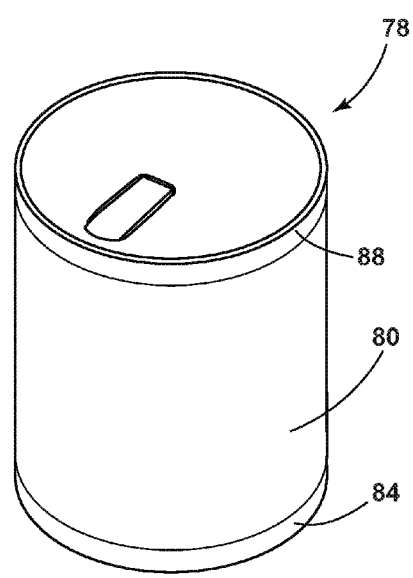
FIG. 11B is a perspective view of a fiber drum.

Referring now to FIG. 11A, another embodiment of a fiber drum 78 is shown having a top portion 88, a bottom portion 84, and a drum wall 80 where the top portion 88 and bottom portion 84 are coupled to the fiber drum wall 80 using a laminated paper stack panel and/or extensible kraft paper laminate 32. FIG. 11B shows the drum 78 assembled with the top portion 88 and bottom portion 84 coupled to the fiber drum wall 80. The fiber drum 78 and/or its various components such as the top portion 88, bottom portion 84, and the fiber drum wall 80 can each be fabricated from the laminated paper stack panel and/or the extensible kraft paper laminates 32 and may include, for example, any of the disclosed combinations listed and shown in FIG. 4 plus other combinations depending on the application and embodiments disclosed herein.

In some embodiments, the fiber drum 70, 78 may include, for example, any product that can be transported in bulk, either dry or liquid, like salt, dry soap, ingredients, glues, pharmaceutical products, chemicals, or food.

Figure 12A:
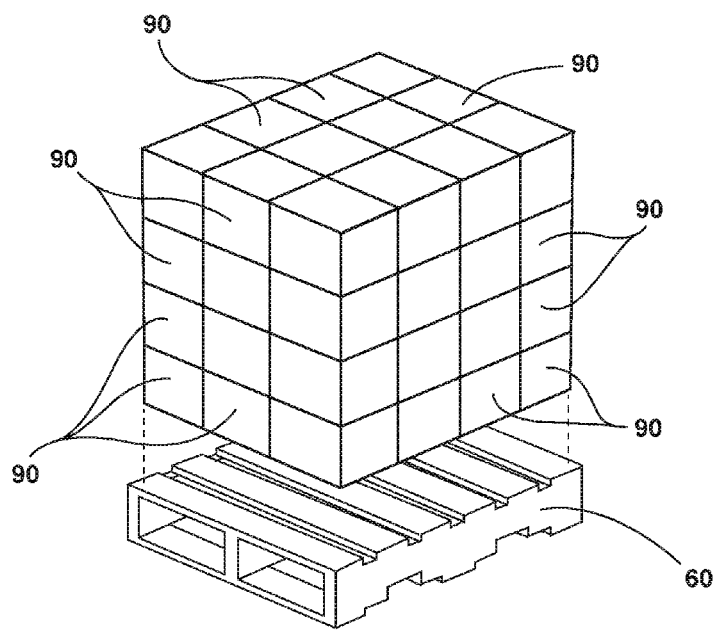
FIG. 12A is a perspective view of a retail carton.

Referring now to FIG. 12A, a retail carton 90 can be tuned to have the desired properties for a given application. For example, FIG. 12A shows that the retail carton 90 can have a stiffness that allows several of the retail cartons 90 to be stacked without damaging the product inside. The retail carton 90 can be fabricated from the laminated paper stack and/or the extensible kraft paper laminate 32 and may include, for example, any of the disclosed combinations listed and shown in FIG. 4 plus other combinations depending on the application and embodiments disclosed herein. In some embodiments, the retail carton 90 may be in the form of a box used to package any number of different materials e.g. cereal, shoes, cosmetics, or bulk food and/or bulk liquids.

Figure 12B:
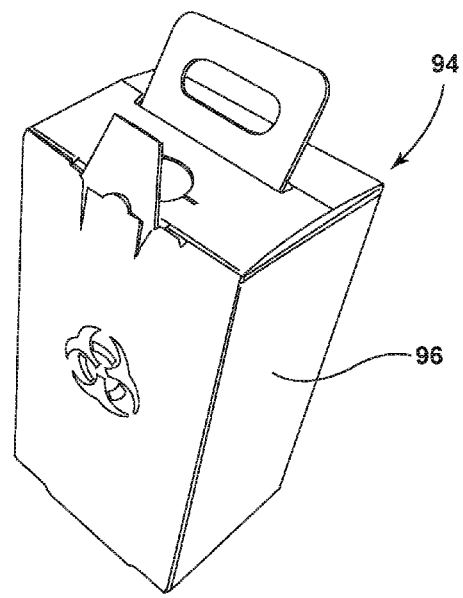
FIG. 12B is a perspective view of a medical carton.

Referring now to FIG. 12B, a medical carton 94 is formed from a medical carton wall 96 folded into a shape resembling the medical carton 94. The medical carton wall 96 can be fabricated from the laminated paper panel stack and/or the extensible kraft paper laminate 32 and may include, for example, any of the disclosed combinations listed and shown in FIG. 4 plus other combinations depending on the application. In some embodiments, the medical carton 94 may be used in the form of a box used to package any number of different materials e.g. medical devices, medical ingredients, or medical supplies.

Figure 13A:
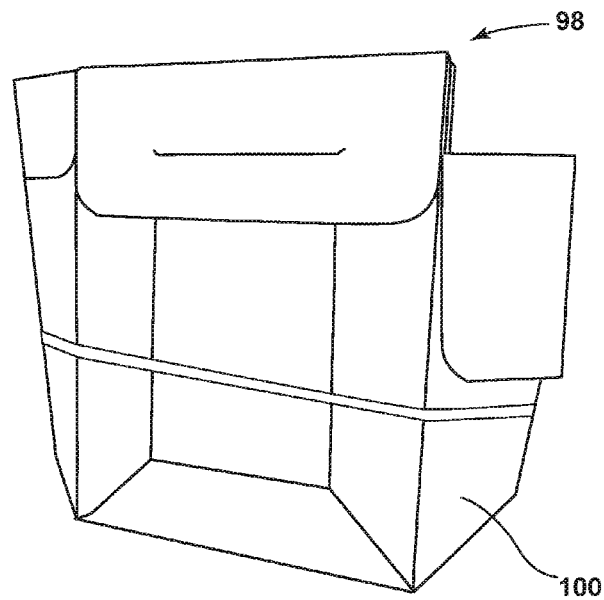
FIG. 13A is a perspective view of a collapsed box for trash.
Figure 13B:
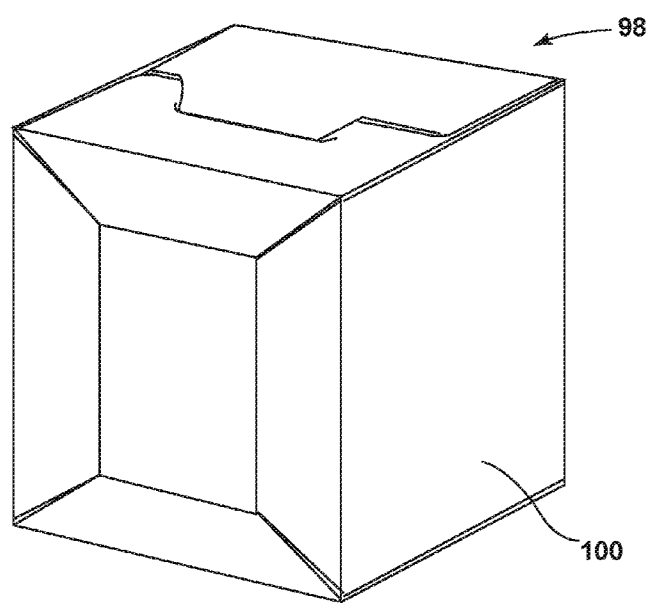
FIG. 13B is a perspective view of an expanded box for trash.

Referring now to FIGS. 13A-13B, a paper box for collecting trash 98 is shown. The paper box for collecting trash 98 is formed from a trash box wall 100. The trash box wall 100 can be fabricated from the laminated paper stack panel and/or the extensible kraft paper laminate 32 and may include, for example, any of the disclosed combinations listed and shown in FIG. 4 plus other combinations depending on the application. FIG. 13A shows the collapsed version and FIG. 13B shows the expanded version of the box for collecting trash 98. In some embodiments, the trash box wall 100 has a thickness of less than 0.050 inches and a mullen of at least 500 psi or at least 600 psi. In other embodiments, the trash box wall 100 has a thickness of less than 0.040 inches and a mullen of at least 500 psi or at least 600 psi.

Figure 14:
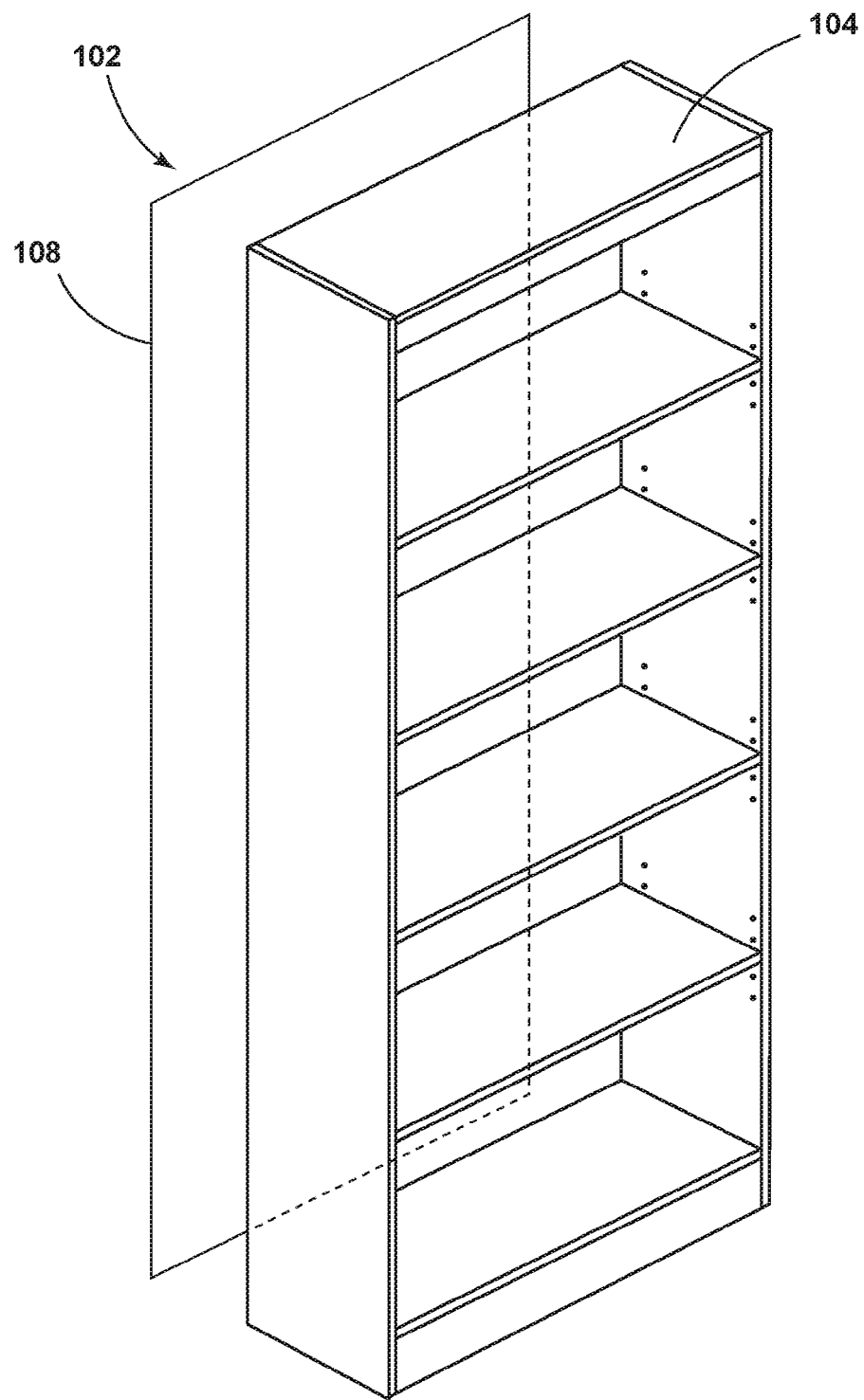
FIG. 14 is a perspective view of a furniture back panel.

Referring now to FIG. 14, a furniture back 102 is shown being made from a furniture back panel 108. The structural integrity of the furniture is directly related to how much force it takes to pull fasteners such as nails or staples either through the panel from front to back and/or vertically or horizontally from the edges. In some embodiments, the nail pull resistance through the panel 108 (laminated paper stack panel and/or extensible kraft paper laminate 32) in any direction can be increased by at least 20%, by at least 15%, by at least 10% or by at least 5% as measured by, for example, ASTM-D 1761-88 Standard Test Methods for Mechanical Fasteners in Wood. In other embodiments, the vertical nail tear resistance and/or horizontal nail tear resistance through the panel 108 (laminated paper stack panel and/or extensible kraft paper laminate 32) in the designated direction can be increased by at least 20%, by at least 15%, by at least 10% or by at least 5% as measured by, for example, ASTM-D 1761-95, ISO 1974, ASTM D689, and/or ASTM D228. The furniture back panel 108 can be fabricated from the laminated paper stack panel and/or the extensible kraft paper laminate 32 and may include, for example, any of the disclosed combinations listed and shown in FIG. 4 plus other combinations depending on the application and embodiments disclosed herein. The furniture back 102 may be used on a piece of furniture 104, for example, a bookcase, desk, dresser, nightstand, etc. to provide structural stability and/or decoration.

Figure 15:
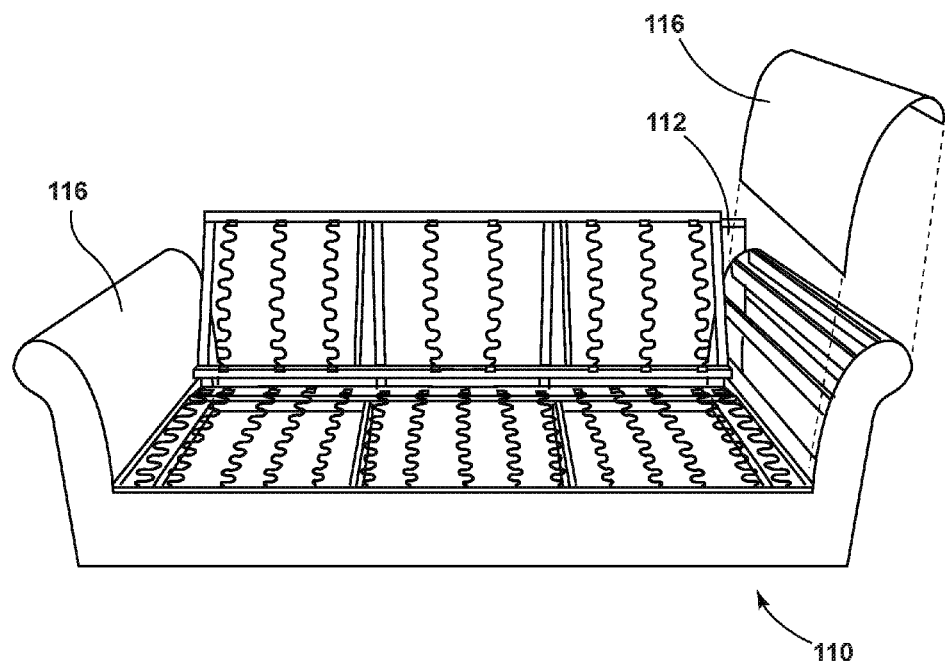
FIG. 15 is a perspective view of a furniture sub-foundation board laminate used on a piece of furniture.

Referring now to FIG. 15, a furniture frame 110 is shown having a frame support 112 to which a sub-foundation board laminate 116 is provided for structural support. Furniture that is shipped pre-assembled is known in the art as case-good furniture and this case-good furniture can utilize the sub-foundation board laminates 116 disclosed herein. The sub-foundation board laminates 116 are coupled to the case-good which includes the furniture frame 112 either by glue, nail, and/or staples. The sub-foundation board laminates 116 are used in a variety of areas to provide support other than the example pictured in FIG. 15. Examples of furniture using the sub-foundation board laminate 116 include, for example, sofas, dressers, couches, upholstered chairs, or any other furniture known in the art. The sub-foundation board laminate 116 can be fabricated from the laminated paper stack panel and/or the extensible kraft paper laminates 32 and may include, for example, any of the disclosed combinations listed and shown in FIG. 4 plus other combinations depending on the application and embodiments disclosed herein.

Figure 16A:
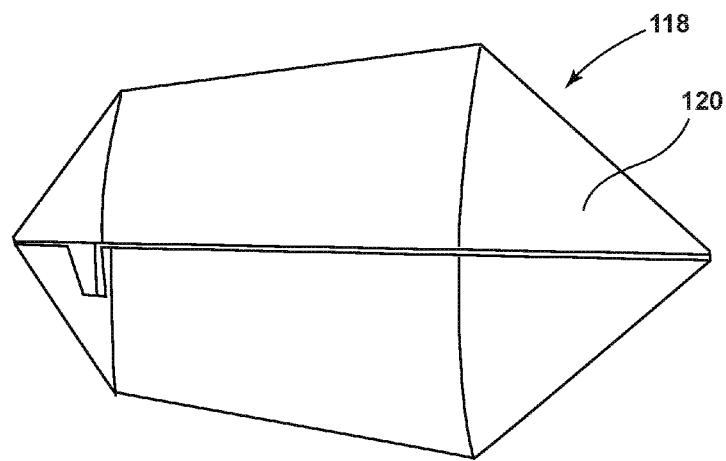
FIG. 16A is a perspective view of a collapsed military packaging box.
Figure 16B:
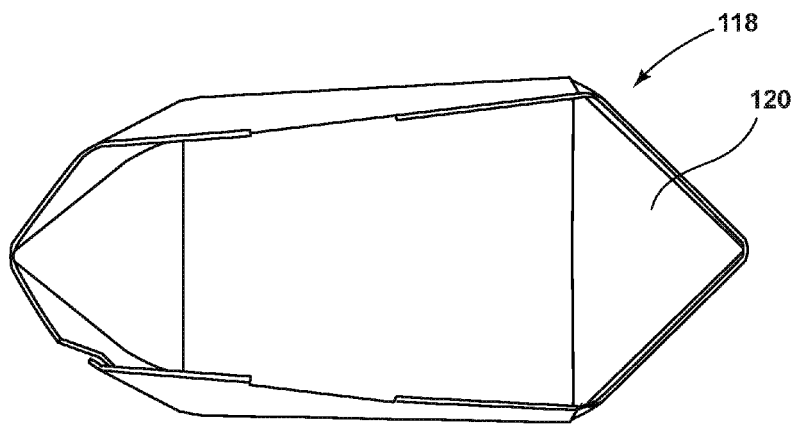
FIG. 16B is a perspective view of an expanded military packaging box.

Referring now to FIGS. 16A-16B, a military packaging box 118 is shown. The military packaging box 118 is fabricated from a box wall 120 that can be folded, overlapped, and/or glued to form the collapsible military packaging box 118. The box wall 120 can be fabricated from the laminated stack panel and/or the extensible kraft paper laminate 32 and may include, for example, any of the disclosed combinations listed and shown in FIG. 4 plus other combinations depending on the application and embodiments disclosed herein. FIG. 16A shows the collapsed state of the military packaging box 118 and FIG. 16B shows the expanded view of the military packaging box 118. In some embodiments, the laminated paper panel and/or the extensible kraft paper laminate 32 may have a weight of about 360 pounds per 1000 sq. ft. and a mullen greater than 600 psi, a weight of about 330 pounds per 1000 sq. ft. and a mullen greater than 500 psi, a weight of about 283 pounds per 1000 sq. ft. and a mullen greater than 350 psi, a weight of about 237 pounds per 1000 sq. ft. and a mullen greater than 275, a weight of about 190 pounds per 1000 sq. ft. and a mullen greater than 200 psi, a weight of about 149 pounds per 1000 sq. ft. and a mullen greater than 174 psi, or a weight of about 114 pounds per 1000 sq. ft. and a mullen greater than 125 psi.

In other embodiments, the laminated paper stack panel and/or the extensible kraft paper laminate 32 used to make the box wall 120 may have a weight less than 250 lb/1000 sq. ft. and a mullen greater than 300 psi, greater than 450 psi, or greater than 600 psi. In still other embodiments, the laminated paper stack panel and/or the extensible kraft paper laminate 32 used to make the box wall 120 may have a weight less than 175 lb/1000 sq. ft. and a mullen greater than 300 psi, greater than 450 psi, or greater than 600 psi. The military packaging box 118 is shown in FIGS. 16A-16B as an example embodiment only, in other embodiments, a V2s, a V3s, a V4s, a W5s, a W6s or any other military box used for food, ammunition or other military supplies may be considered by those skilled in the art to be included under the scope of this invention.

Figure 17:
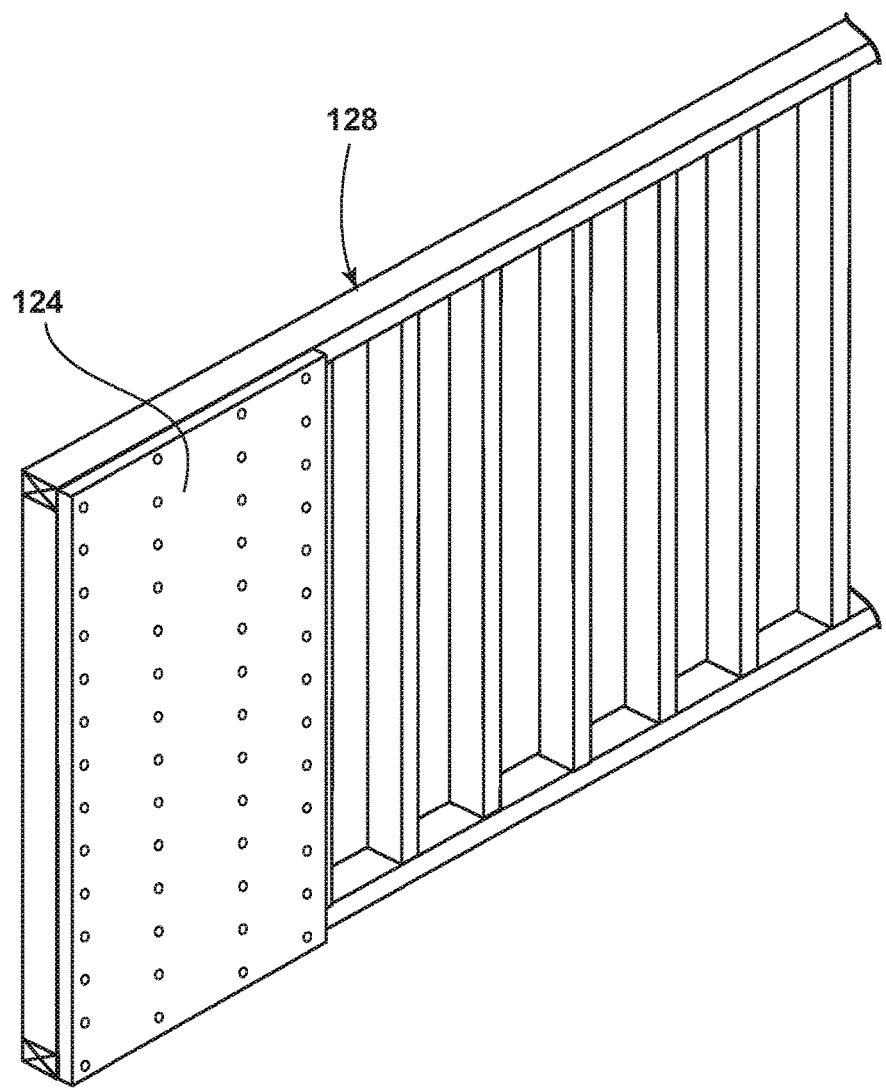
FIG. 17 is a perspective view of a sheathing board used in construction.

Referring now to FIG. 17, a sheathing board 124 can be used in construction applications and can be coupled, for example, to a wall frame 128. In manufactured housing and/or wood framed construction, a sheathing board 124 is used when racking is a parameter to be controlled. Racking is commonly referred to as "allowable racking load" and/or "racking shear value" and is designated in pounds per square feet. In some embodiments, the laminated paper stack panel and/or the extensible kraft paper laminate 32 may have a racking shear value of about 400 pounds per sq. ft. and a thickness of about 0.140 inches, about 200 pounds per sq. ft. and a thickness of about 0.120 inches, about 180 pounds per sq. ft. and a thickness of about 0.105, about 160 pounds per sq. ft. and a thickness of about 0.080 inches, about 180 pounds per sq. ft. and a thickness of about 0.115 inches, about 130 pounds per sq. ft. and a thickness of about 0.105 inches, or about 159 pounds per sq. ft. and a thickness of about 0.078 inches. The sheathing board 124 can be fabricated from the laminated paper stack panel and/or the extensible kraft paper laminate 32 and may include, for example, any of the disclosed combinations listed and shown in FIG. 4 plus other combinations depending on the application. The sheathing board 124 may be used as a construction material, for example, a roof, a wall, a floor, in homes, recreational vehicles or mobile homes etc. to provide structural stability.

The laminated paper stack panel and/or the extensible kraft paper laminate 32 may be used to fabricate or make the sleeve 40, the reel wrap 48, the slip sheet 56, the carrying crate 62, the fiber drum 70, 78, the retail carton 90, the medical carton 94, the box for trash 98, the furniture back 102, the sub-foundation board laminate 116, the sheathing board 124, and the military packaging box 118. The uses of the laminated paper stack panel and/or the extensible kraft paper laminate 32 provided herein are meant to be exemplary and any other additional use or application of the laminated paper stack panels and/or the extensible kraft paper laminates 32 described herein are additionally incorporated herein.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (chemical, electrical or mechanical) directly or indirectly to one another. Such joining may be stationary in nature or movable in nature. Such joining may be achieved with the two components (chemical, electrical or mechanical) and any additional intermediate members being integrally formed as a single unitary body with one another or with the two components. Such joining may be permanent in nature or may be removable or releasable in nature unless otherwise stated. In some embodiments, the laminated paper stack panel and/or the extensible kraft paper laminates 32 may be coupled using a glue, a water soluble glue, a hot melt adhesion, or any other means known in the art to couple paper laminates together.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, thicknesses, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of thicknesses, colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

It should be understood that the foregoing is merely exemplary of the preferred practice of the present invention and that various modifications may be made in the arrangements and details of the construction of the present invention without departing form the spirit and scope of the present invention.

List of Non-Limiting Embodiments

Embodiment A is laminated paper stack panel comprising: one or more layers of an extensible kraft paper; and one or more layers of a non-extensible kraft paper; wherein the extensible kraft paper has a basis weight of 25-200 pounds per 3000 sq. ft.

The laminated paper stack panel of Embodiment A wherein the laminated paper stack panel comprises two layers of extensible kraft paper, each layer of extensible kraft paper having a basis weight of 25-200 pounds per 3000 sq. ft.

The laminated paper stack panel of Embodiment A or Embodiment A with any of the intervening features wherein the laminated paper stack panel comprises three layers of extensible kraft paper, each layer of extensible kraft paper having a basis weight of 25-200 pounds per 3000 sq. ft.

The laminated paper stack panel of Embodiment A or Embodiment A with any of the intervening features wherein the laminated paper stack has a mullen of at least 125 psi.

The laminated paper stack panel of Embodiment A or Embodiment A with any of the intervening features for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

The laminated paper stack panel of Embodiment A or Embodiment A with any of the intervening features for its use as a packaging.

The laminated paper stack panel of Embodiment A or Embodiment A with any of the intervening features wherein the laminated paper stack panel comprises two or more layers of extensible kraft paper having a basis weight of 25-200 pounds per 3000 sq. ft. laminated to one or more layers of non-extensible kraft paper, each layer of non-extensible kraft paper having a basis weight of 10-2250 pounds per 1000 sq. ft.

The laminated paper stack panel of Embodiment A or Embodiment A with any of the intervening features wherein the laminated paper stack panel is used as a furniture back panel and/or a sheathing board to give a racking shear value of about 160 pounds per sq. ft.

The laminated paper stack panel of Embodiment A or Embodiment A with any of the intervening features wherein the laminated paper stack panel has an increase in a nail pull resistance, a vertical nail tear resistance, and/or a horizontal nail tear resistance by at least 5% as measured by ASTM-D 1761-88 and/or ASTM-D 1761-95.

The laminated paper stack panel of Embodiment A or Embodiment A with any of the intervening features wherein the laminated paper stack panel has an increase in a machine direction tensile strength and/or a cross machine direction tensile strength by at least 5% as measured by TAPPI-T494.

Embodiment B is an extensible kraft paper laminate comprising: a layer of an extensible kraft paper; and at least one layer of a non-extensible kraft paper or one or more additional layers of the extensible kraft paper; wherein the extensible kraft paper has a basis weight of 25-200 pounds per 3000 sq. ft. and wherein the layers are laminated with a glue.

The extensible kraft paper laminate of Embodiment B wherein the extensible kraft paper laminate has a thickness of 0.500 inches or less.

The extensible kraft paper laminate of Embodiment B or Embodiment B with any of the intervening features wherein the extensible kraft paper laminate has a thickness of 0.240 inches or less.

The extensible kraft paper laminate of Embodiment B or Embodiment B with any of the intervening features wherein the extensible kraft paper laminate has a mullen of at least 125 psi.

The extensible kraft paper laminate of Embodiment B or Embodiment B with any of the intervening features wherein the extensible kraft paper laminate comprises two or more layers of extensible kraft paper, each layer of extensible kraft paper having a basis weight of 25-200 pounds per 3000 sq. ft.

The extensible kraft paper laminate of Embodiment B or Embodiment B with any of the intervening features wherein the extensible kraft paper laminate has a thickness of 0.240 inches or less.

The extensible kraft paper laminate of Embodiment B or Embodiment B with any of the intervening features for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

The extensible kraft paper laminate of Embodiment B or Embodiment B with any of the intervening features wherein the extensible kraft paper laminate is used as a furniture back panel and/or a sheathing board to give a racking shear value of about 160 pounds per sq. ft.

The extensible kraft paper laminate of Embodiment B or Embodiment B with any of the intervening features wherein the extensible kraft paper laminate has an increase in a nail pull resistance, a vertical nail tear resistance, and/or a horizontal nail tear resistance by at least 5% as measured by ASTM-D 1761-88 and/or ASTM-D 1761-95.

The extensible kraft paper laminate of Embodiment B or Embodiment B with any of the intervening features wherein the extensible kraft paper laminate has an increase in a machine direction tensile strength and a cross machine direction tensile strength by at least 5% as measured by TAPPI-T494.

The invention claimed is:

1. A multi-layered laminated paper structure, comprising:
   one or more layers of an extensible kraft paper; wherein the extensible kraft paper has a basis weight of 25-200 pounds per 3000 sq. ft
   one or more layers of a non-extensible kraft paper; and
   a layer of adhesive which bonds each of the layers of extensible or non-extensible kraft paper together to form a solid laminated paper structure having improved strength.

2. The multi-layered laminated paper structure according to claim 1, wherein the laminated paper structure comprises two layers of extensible kraft paper, each layer of extensible kraft paper having a basis weight of 25-200 pounds per 3000 sq. ft.

3. The multi-layered laminated paper structure according to claim 1, wherein the laminated paper structure comprises three layers of extensible kraft paper, each layer of extensible kraft paper having a basis weight of 25-200 pounds per 3000 sq. ft.

4. The multi-layered laminated paper structure according to claim 1, for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

5. The multi-layered laminated paper structure according to claim 1, wherein the laminated paper structure comprises two or more layers of extensible kraft paper having a basis weight of 25-200 pounds per 3000 sq. ft. laminated to one or more layers of non-extensible kraft paper, each layer of non-extensible kraft paper having a basis weight of 10-240 pounds per 1000 sq. ft.

6. The multi-layered laminated paper structure according to claim 1, wherein the laminated paper structure is used as a furniture back panel and/or a sheathing board to give a racking shear value of about 160 pounds per sq. ft.

7. The multi-layered laminated paper structure according to claim 1, wherein the laminated paper structure has an increase in a nail pull resistance, a vertical nail tear resistance, and/or a horizontal nail tear resistance by at least 5% as measured by ASTM-D 1761-88 and/or ASTM-D 1761-95.

8. The multi-layered laminated paper structure according to claim 1, wherein the laminated paper structure has an increase in a machine direction tensile strength and/or a cross machine direction tensile strength by at least 5% as measured by TAPPI-T494.

9. A multi-layered laminate paper structure comprising:
   two or more layers of extensible kraft paper; wherein each layer of the extensible kraft paper has a basis weight of 25-200 pounds per 3000 sq. ft; and
   a layer of adhesive which bonds each of the layers of extensible kraft paper together to form a solid laminated paper structure having improved strength.

10. The multi-layered laminated paper structure according to claim 9, wherein the multi-layered laminated paper structure has a thickness of 0.050 inches or less.

11. The multi-layered laminated paper structure according to claim 9, for its use as an apparatus selected from the group consisting of a sleeve, a reel wrap, a slip sheet, a carrying crate, a fiber drum, a retail carton, a food carton, a medical carton, a box for trash, a furniture back, a sheathing board, and a military packaging box.

12. The multi-layered laminated paper structure according to claim 9, wherein the multi-layered laminated paper structure is used as a furniture back panel and/or a sheathing board to give a racking shear value of about 160 pounds per sq. ft.

13. The multi-layer laminate paper structure according to claim 9, wherein the multi-layered laminated paper structure has an increase in a nail pull resistance, a vertical nail tear resistance, and/or a horizontal nail tear resistance by at least 5% as measured by ASTM-D 1761-88 and/or ASTM-D 1761-95.

14. The multi-layered laminated paper structure according to claim 9, wherein the multi-layered laminated paper structure has an increase in a machine direction tensile strength and a cross machine direction tensile strength by at least 5% as measured by TAPPI-T494.

15. The multi-layered laminated paper structure according to claim 1 wherein strength of the laminated paper structure is one of mullen, tear, or tensile strength.

16. The multi-layered laminated paper structure according to claim 15 wherein the laminated paper structure has a mullen of 280 psi or more.

17. The multi-layered laminated paper structure according to claim 16 wherein the laminated paper structure has a cumulative basis weight of 900 pounds per 3000 sq. ft. or less.

18. The multi-layered laminated paper structure according to claim 17 wherein the laminated paper structure has a cumulative thickness of 0.050 inches or less.

19. The multi-layered laminated paper structure according to claim 1 wherein the laminated paper structure has a cumulative thickness of 0.050 inches or less.

20. The multi-layered laminated paper structure according to claim 1 wherein the laminated paper structure has a cumulative basis weight of 900 pounds per 3000 sq. ft. or less.

21. The multi-layered laminated paper structure according to claim 9, wherein the laminated paper structure comprises three layers of extensible kraft paper, each layer of extensible kraft paper having a basis weight of 50-100 pounds per 3000 sq. ft.

22. The multi-layered laminated paper structure according to claim 21 wherein the laminated paper structure has a cumulative mullen of 285 psi or more.

23. The multi-layered laminated paper structure according to claim 22 wherein the laminated paper structure has a cumulative thickness of 0.03 inches or less.

24. The multi-layered laminated paper structure according to claim 23 wherein the laminated paper structure has a cumulative basis weight of 300 pounds per 3000 sq. ft or less.

25. The multi-layered laminated paper structure according to claim 9 wherein strength of the laminated paper structure is one of mullen, tear, or tensile strength.

26. The multi-layered laminated paper structure according to claim 25 wherein the laminated paper structure has a mullen of at least 280 psi.

27. The multi-layered laminated paper structure according to claim 26 wherein the laminated paper structure has a cumulative basis weight of 200 pounds per 3000 sq. ft or less.

28. The multi-layered laminated paper structure according to claim 27 wherein the laminated paper structure has a cumulative thickness of 0.050 inches or less.

29. The multi-layered laminated paper structure according to claim 9 wherein the laminated paper structure has a cumulative thickness of 0.050 inches or less.

30. The multi-layered laminated paper structure according to claim 9 wherein the laminated paper structure has a cumulative basis weight of 200 pounds per 3000 sq. ft or less.

31. The multi-layered laminated paper structure according to claim 9, wherein the laminated paper structure is used as a furniture back panel and/or a sheathing board to give a racking shear value of about 160 pounds per sq. ft.

\* \* \* \* \*